(12) United States Patent
Osborne et al.

(10) Patent No.: US 8,404,023 B1
(45) Date of Patent: Mar. 26, 2013

(54) AIR HANDLING FILTRATION EQUIPMENT WITH ADJUSTABLE MEDIA BED AND METHOD OF USE

(75) Inventors: Michael W. Osborne, Louisville, KY (US); M. Aflal Rahmathullah, Louisville, KY (US); Cheah Wei Ng, Selangor (MY)

(73) Assignee: AAF-McQuay Inc., Louisville, KY (US)

( * ) Notice: Subject to any disclaimer, the term of this patent is extended or adjusted under 35 U.S.C. 154(b) by 389 days.

(21) Appl. No.: 12/796,415

(22) Filed: Jun. 8, 2010

Related U.S. Application Data

(62) Division of application No. 12/796,291, filed on Jun. 8, 2010.

(51) Int. Cl.
*B01D 53/02* (2006.01)
(52) U.S. Cl. .................................. 95/90; 95/148; 95/273
(58) Field of Classification Search .................. 55/385.2, 55/385.1, 485, 486, 496, 497, DIG. 18, 481, 55/491, 499, 501; 95/285, 287; 454/187; 96/151
See application file for complete search history.

(56) References Cited

U.S. PATENT DOCUMENTS

| | | | |
|---|---|---|---|
| 1,599,652 | A | 9/1926 | Cranston |
| 1,867,325 | A | 4/1932 | Neville |
| 2,197,004 | A | 4/1940 | Myers |
| 2,962,183 | A | 11/1960 | Rill, Jr. et al. |
| 3,126,591 | A | 3/1964 | Hamilton |
| 3,487,625 | A | 1/1970 | Lucas |
| 3,683,594 | A | 8/1972 | Schouw |
| 3,738,489 | A | 6/1973 | Kraemer, II |
| 3,925,046 | A | 12/1975 | Hickey et al. |
| 4,175,936 | A | 11/1979 | Lough et al. |
| 4,284,500 | A | 8/1981 | Keck |
| 4,300,921 | A | 11/1981 | Littrell |
| 4,307,773 | A | 12/1981 | Smith |
| 4,340,478 | A | 7/1982 | Stannard et al. |
| 4,371,386 | A | 2/1983 | DeVecchi |
| 4,452,613 | A | 6/1984 | Littrell |
| 4,545,523 | A | 10/1985 | Galbreath et al. |
| 4,555,331 | A | 11/1985 | Thornton et al. |

(Continued)

FOREIGN PATENT DOCUMENTS

| | | |
|---|---|---|
| JP | 11090144 A | 4/1994 |
| JP | 2001000987 A | 1/2001 |

(Continued)

OTHER PUBLICATIONS

AAF International; AmericanAirFilter SAAFCarb Media; product data sheet; Jul. 2009; pp. 1-4; AAF International; USA.

(Continued)

*Primary Examiner* — Duane Smith
*Assistant Examiner* — Minh-Chau Pham
(74) *Attorney, Agent, or Firm* — Middleton Reutlinger

(57) ABSTRACT

A method of transferring filter media between a media bed of a dry scrubber and a filter media container, comprising placing the media bed in flow communication with the filter media container, obstructing a majority of an airflow path of the media bed, the airflow path extending from an unfiltered air input opening of the dry scrubber, through the media bed of the dry bed scrubber, to a filtered air output opening of said dry bed scrubber, powering a blower in the airflow path of the media bed when the airflow path is obstructed and the media bed is in flow communication with the filter media container, whereby the filter media is transferred between the media bed and the filter media container.

12 Claims, 10 Drawing Sheets

U.S. PATENT DOCUMENTS

| | | | |
|---|---|---|---|
| 4,718,156 A * | 1/1988 | Cole | 29/890.14 |
| 4,732,675 A | 3/1988 | Badalato et al. | |
| 4,880,448 A | 11/1989 | Scherrer | |
| 5,069,799 A | 12/1991 | Brownawell et al. | |
| 5,183,488 A | 2/1993 | Deering | |
| 5,217,513 A | 6/1993 | Armbruster | |
| 5,224,974 A | 7/1993 | Johnson | |
| 5,255,081 A | 10/1993 | Miyamoto et al. | |
| 5,553,871 A | 9/1996 | Rowe et al. | |
| 5,591,244 A | 1/1997 | Vross et al. | |
| 5,626,820 A | 5/1997 | Kinkead et al. | |
| 5,733,348 A | 3/1998 | Skarsten | |
| 5,744,030 A | 4/1998 | Reid et al. | |
| 5,837,040 A | 11/1998 | Caughron et al. | |
| 5,873,919 A | 2/1999 | Vross et al. | |
| 5,964,927 A | 10/1999 | Graham et al. | |
| 5,968,217 A | 10/1999 | Stein et al. | |
| 6,068,686 A | 5/2000 | Sorensen et al. | |
| 6,090,188 A | 7/2000 | Yang et al. | |
| 6,099,612 A | 8/2000 | Bartos | |
| 6,102,977 A | 8/2000 | Johnson | |
| 6,117,202 A | 9/2000 | Wetzel | |
| 6,152,980 A | 11/2000 | Culwell | |
| 6,200,465 B1 | 3/2001 | Carawan et al. | |
| 6,287,023 B1 | 9/2001 | Yaegashi et al. | |
| 6,344,074 B1 | 2/2002 | Ward et al. | |
| 6,402,613 B1 | 6/2002 | Teagle | |
| 6,413,302 B1 | 7/2002 | Harrison et al. | |
| 6,502,909 B1 | 1/2003 | Swilik, Jr. et al. | |
| 6,682,576 B1 | 1/2004 | Kiyotani et al. | |
| 6,698,608 B2 | 3/2004 | Parker et al. | |
| 6,796,452 B2 | 9/2004 | Petzitillo, Jr. et al. | |
| 6,879,256 B1 | 4/2005 | Redfern et al. | |
| 6,916,360 B2 | 7/2005 | Seguin et al. | |
| 7,014,693 B2 | 3/2006 | Kishkovich et al. | |
| 7,041,159 B2 | 5/2006 | Entezarian et al. | |
| 7,152,375 B1 | 12/2006 | Mastro et al. | |
| 7,157,766 B2 | 1/2007 | Gau et al. | |
| 7,258,728 B2 | 8/2007 | Lim et al. | |
| 7,374,676 B2 | 5/2008 | Dew, Jr. | |
| 7,441,308 B1 | 10/2008 | Pappas | |
| 7,442,237 B1 | 10/2008 | Gardner | |
| 7,451,714 B1 | 11/2008 | Redfern et al. | |
| 7,465,393 B2 | 12/2008 | Kouters et al. | |
| 7,540,901 B2 | 6/2009 | Kishkovich et al. | |
| 7,585,346 B2 | 9/2009 | Roseberry et al. | |
| 7,585,359 B2 | 9/2009 | Withiam et al. | |
| 7,588,629 B2 | 9/2009 | Osborne et al. | |
| 2005/0045039 A1 | 3/2005 | Shellhammer et al. | |
| 2005/0204922 A1 | 9/2005 | Wu et al. | |
| 2006/0135335 A1 | 6/2006 | Dawson et al. | |
| 2006/0175245 A1 | 8/2006 | Gerteis et al. | |
| 2007/0012185 A1 | 1/2007 | Taylor, Jr. et al. | |
| 2007/0044438 A1 | 3/2007 | Morse et al. | |
| 2007/0074454 A1 | 4/2007 | Oomen | |
| 2007/0093196 A1 | 4/2007 | Morse et al. | |
| 2007/0093776 A1 | 4/2007 | Stephens et al. | |
| 2007/0171389 A1 | 7/2007 | Li | |
| 2007/0199289 A1 | 8/2007 | Bland, Jr. et al. | |
| 2008/0011683 A1 | 1/2008 | Dong et al. | |
| 2008/0034718 A1 | 2/2008 | Schuld et al. | |
| 2008/0078289 A1 | 4/2008 | Sergi et al. | |
| 2008/0173178 A1 | 7/2008 | Metteer | |
| 2008/0173581 A1 | 7/2008 | Maclean | |
| 2008/0190287 A1 | 8/2008 | Orava | |
| 2008/0257804 A1 | 10/2008 | Dew | |
| 2009/0025561 A1 | 1/2009 | Tuma | |
| 2009/0056536 A1 | 3/2009 | Wright | |
| 2009/0090240 A1 | 4/2009 | Husain | |
| 2009/0095291 A1 | 4/2009 | Wruck | |
| 2009/0158886 A1 | 6/2009 | O'Connell et al. | |
| 2009/0211453 A1 | 8/2009 | Nassivera et al. | |
| 2010/0251677 A1 | 10/2010 | Franck | |
| 2010/0251678 A1 | 10/2010 | Mann et al. | |
| 2010/0275562 A1 | 11/2010 | Ashwood et al. | |
| 2011/0314781 A1 | 12/2011 | Greist et al. | |
| 2012/0192718 A1 * | 8/2012 | Sukhman et al. | 95/287 |

FOREIGN PATENT DOCUMENTS

| | | |
|---|---|---|
| JP | 02006813 A | 1/2002 |
| JP | 2002336625 A | 11/2002 |

OTHER PUBLICATIONS

AAF International; AmericanAirFilter SAAFOxidant; product data sheet; Sep. 2009; pp. 1-2; AAF International; USA.

AAF International; AmericanAirFilter SAAFBlend GP; product data sheet; Mar. 19, 2010; p. 1; AAF International; USA.

Purafil; Purafil Multi-Option Deep Bed Scrubber; product data sheet; 2006; pp. 1-2; Purafil; USA.

Purafil; Purafil ESD Deep Bed Scrubber; product data sheet; no date given; p. 1; Purafil; USA.

Filter Innovations Inc.; FII Deep Bed Media Air Scrubbers; product data sheet; no date given; pp. 1-2; Filter Innovations Inc.; Canada.

Circul-Aire; DAS Deep Bed, Air, Scrubber; product data sheet; no date given; pp. 1-24; Circul-Aire; Canada.

* cited by examiner

AIR HANDLING FILTRATION EQUIPMENT WITH ADJUSTABLE MEDIA BED AND METHOD OF USE

CROSS-REFERENCE TO RELATED DOCUMENTS

This present application is a divisional patent application which claims priority to and benefit from, currently pending, U.S. patent application Ser. No. 12/796,291, filed on Jun. 8, 2010.

TECHNICAL FIELD

This invention pertains to a deep bed scrubber. More pertinently, the invention pertains to a deep bed scrubber having adjustable compartment walls which define a plurality of media bed compartments.

BACKGROUND

Scrubbers are utilized in a variety of applications for the purpose of cleaning contaminated air to acceptable levels of corrosive, malodorous gases and/or particulate matter. Various applications require this type of complete air filtration solution. For example, such applications are required for airports, museums, electronic or pharmaceutical clean rooms, petrochemical and refining industries, indoor air applications as well as various other facilities. These and other industries all have specific needs related to a specific industries, but all require the ability to scrub contaminated air to acceptable levels.

Several types and methods of use for scrubbers have been used in the past. These systems may be classified to wet and dry scrubbing systems. Wet scrubbing systems that use a water or chemical spray to solvate and concentrate the contaminants in an air stream into a liquid stream for removal from the air stream. On the other hand, dry scrubbing systems use specially formulated solid adsorbents for the collection of gaseous contaminants. The solid adsorbents utilized include, for example, impregnated or non-impregnated activated carbons and potassium or sodium permanganate supported over activated alumina that can physically or chemically adsorb contaminants out of the air stream. The solid adsorbents may be loaded into a filtration section having one or more media beds. A stream of air is then passed through the one or more media beds to clean the air of certain gases and matter. After the solid adsorbents have been used in the scrubbing system for a period of time they will become loaded or spent. Such spent solid adsorbents are then replaced with fresh material to continue efficient and effective scrubbing operations.

Dry scrubbers operating in this fashion have typically utilized fixed bed volumes. The operating lifetime impacts the media replacement schedule and related media replacement costs and the amount of pressure drop impacts energy usage of the scrubbing system and associated energy costs. Dry scrubbing systems typically have fixed volume media beds within which the adsorbent media is loaded. As a result, in a typical fixed volume media bed design the energy usage is non-alterable over the lifetime of the scrubbing system and the media replacement schedule is also non-adjustable by a user over the lifetime of the scrubbing system.

It would be desirable to overcome these and other deficiencies by making the bed volume alterable, to provide for decreased pressure drop and also decrease the residence times and improve media capture efficiency.

SUMMARY

A deep bed scrubber filter section, comprises an unfiltered air input end, a filtered air output end, an airflow filtration path extending from the unfiltered air input end to the filtered air output end, a plurality of media beds along the airflow filtration path in series arrangement with one another, the media beds each having a media bed volume and each being defined by a plurality of sidewalls, two of the sidewalls of each of the media beds being perforated sidewalls at least partially intersecting the airflow filtration path, wherein an adjustable sidewall of at least one of the perforated sidewalls of a first media bed of the media beds is independently removable from the airflow filtration path and is independently adjustable to a plurality of positions along the airflow filtration path, wherein adjustment of the at least one adjustable sidewall of the first media bed alters the media bed volume of the first media bed. The deep bed scrubber filtration section wherein the adjustable sidewall of the first media bed slidably engages at least one interiorly extending track, The deep bed scrubber filtration section wherein the adjustable sidewall of the first media bed engages the first interiorly extending track in a first position of the plurality of positions and engages a second interiorly extending track in a second position of the plurality of positions. The deep bed scrubber filtration section wherein the second track is at a different distance from the filtered air output end than the first track. The deep bed scrubber filtration section wherein at least one of the perforated sidewalls of a second media bed of the plurality of media beds is independently removable from the airflow filtration path and is independently adjustable to a plurality of positions along the airflow filtration path. The deep bed scrubber filtration section further comprising a media. The deep bed scrubber filtration section wherein varying a position of the adjustable sidewall varies an amount of the media usable in at least one of the media beds. The deep bed scrubber filtration section wherein varying the amount of media varies the life of the media in the media bed.

A deep bed scrubber filtration section comprises a plurality of outer sidewalls defining the filtration section, an unfiltered air input end, a filtered air output end, an airflow filtration path extending between the unfiltered air input end and the filtered air output end, at least one media bed along the airflow filtration path, the at least one media bed having a media bed volume each being defined by a plurality of sidewalls, at least one of the plurality of sidewalls of the media bed being perforated sidewalls at least partially intersecting the airflow filtration path, wherein the at least one perforated sidewall of each of the at least one media beds is removable and adjustable to a plurality of positions along the airflow filtration path, wherein adjustment of the perforated sidewalls alters the media bed volume of at least one of said media beds. The deep bed scrubber filtration section further comprising at least one interior track on two opposed sidewalls of the plurality of sidewalls. The deep bed scrubber filtration section wherein the at least one perforated sidewall is received by the at least one track. The deep bed scrubber filtration section wherein the at least one track being multiple tracks on the two opposed sidewalls. The deep bed scrubber filtration section the at least two tracks being disposed on a single wall and spaced apart along the air flow filtration path. The deep bed scrubber filtration section further comprising tracks disposed in a central area of the filtration section and spaced from the outer sidewall. The deep bed scrubber filtration section wherein the at least two tracks being spaced apart by a distance of about six inches.

A deep bed scrubber filtration section, comprises a plurality of outer walls defining the filtration section, a first unfiltered air input end, a second filtered air output end, a plurality of media compartments defined between the first end and the second end, the plurality of media compartments arranged in series with one another, an air flow filtration path extending between the first end and the second end through the plurality of media compartments, a plurality of tracks spaced apart to receive at least one moveable perforated sidewall disposed at least at one location between the first input end and the second output end, the sidewall being movable from a first position to at least a second position in the direction of the air flow filtration flow path, the moveable perforated sidewall varying a volume of at least one of the plurality of media compartments, the varying of the volume allowing varying of a life of the media in the media bed. The deep bed scrubber filtration section further comprising a plurality of tracks along the plurality of outer walls for receiving the movable perforated sidewall. The deep bed scrubber filtration section wherein the plurality of tracks are spaced in the direction of the air flow filtration path to adjust the perforated sidewall. The deep bed scrubber filtration section wherein the movable perforated sidewall being disposed substantially transverse to the air flow filtration path. The deep bed scrubber filtration section further comprising tracks disposed inwardly of the outer walls in a generally central portion of the filtration section.

A deep bed scrubber filtration section, comprises an unfiltered air input end, a filtered air output end, an air flow filtration path extending from the unfiltered air input end to the filtered air output end, at least one media bed along a section of the air flow filtration path, the media bed being defined by a plurality of sidewalls, two of the sidewalls being perforated sidewalls at least partially intersecting the air flow filtration path, wherein each of the perforated sidewalls is adjustable between at least a first orientation and a second orientation, wherein in the first orientation the perforated sidewalls are substantially perpendicular to the section of the air flow filtration path and wherein in the second orientation the perforated sidewalls are at an angle of twenty to seventy degrees with respect to the section of the airflow filtration path. The deep bed scrubber filter section wherein each of the perforated sidewalls of the first media bed slidably engages at least one interiorly extending track. The deep bed scrubber filter section wherein each of the perforated sidewalls engages a first slot of the interiorly extending track in the first orientation and engages a second slot of the interiorly extending track in the second orientation. The deep bed scrubber filter section wherein each of the perforated sidewalls is removable from the airflow filtration path. The deep bed scrubber filter section wherein each of the perforated sidewalls is independently removable from the airflow filtration path. The deep bed scrubber filter section wherein the second orientation increases an available surface area for use in filtering. The deep bed scrubber filter section further comprising tracks disposed along the walls of the filtration section at an angle to the walls.

A deep bed scrubber filtration section, comprises a first unfiltered air input end, a second filtered air output end, an air flow filtration path defined between the first end and the second end, a media bed disposed along the air flow filtration path, a perforated sidewall which defined a media bed depth measured in the direction of said air flow filtration path, a plurality of track members disposed along an interior of the filtration section, the perforated sidewall having at least one position which is generally perpendicular to the air flow filtration path and at least a second position which is disposed at a preselected angle to the air flow filtration path. The deep bed scrubber filtration section wherein the track members are spaced apart about six inches along two opposed walls. The deep bed scrubber filtration section wherein the perforated sidewall is disposed at an angle to walls defining the filtration section. The deep bed scrubber filtration section wherein the filter section further comprises two opposed walls extending between the air input end and the air output end. The deep bed scrubber filtration section wherein the preselected angle is measured from either of the opposed walls. The deep bed scrubber filtration section wherein the track members are disposed on the opposed walls extending between the air input end and the air output end. The deep bed scrubber filtration section wherein the preselected angle is between 20 and 70 degrees. The deep bed scrubber filtration section further comprising the plurality of track members disposed along walls of the filtration section at an angle to the walls.

A method of transferring filter media between a media bed of a dry scrubber and a filter media container, comprising placing the media bed in flow communication with the filter media container, obstructing a majority of an airflow path of the media bed, the airflow path extending from an unfiltered air input opening of the dry scrubber, through the media bed of the dry bed scrubber, to a filtered air output opening of said dry bed scrubber, powering a blower in the airflow path of the media bed when the airflow path is obstructed and the media bed is in flow communication with the filter media container, whereby the filter media is transferred between the media bed and the filter media container. The method of transferring filter media wherein the filter media is pushed from the media bed to the filter media container. The method of transferring filter media wherein the filter media is pulled from the filter media container to the filter media bed. The method of transferring filter media wherein the airflow path is obstructed at a location downstream of the media bed. The method of transferring filter media wherein the airflow path is obstructed at a location upstream of the media bed. The method of transferring filter media wherein the airflow path is obstructed at a location upstream of said blower.

A method of transferring filter media between a media bed of a dry scrubber and a filter media container, comprises positioning blanks over an air intake for an air handling system, positioning a blank at an output end of a blower section having a blower therein, opening a vent in the blower section of the air handling system, placing a spent media collector in fluid communication with at least one media bed in a filtration section, powering the blower section and utilizing the blower to create a vacuum pressure and, collecting spent media from the at least one media bed with the vacuum pressure. The method further comprising positioning a blank over the output end of the air handling system. The method wherein the positioning, the opening and the placing occurring in any order.

A method of transferring filter media between a media container and a dry scrubber media bed section, comprises positioning at least one blank over an air intake for an air handling system, positioning at least one blank between a blower section and the dry scrubber media bed section, positioning at least one blank at an output end of the dry scrubber media bed section, opening a vent in one of a blower section having a blower therein or upstream of the media bed section, placing the media container having fresh filtration media in fluid communication with the dry scrubber media bed section, placing a vacuum pressure on the media bed section and moving the fresh filtration media from the media container into the dry scrubber media bed section. The method further comprising exhausting the blower through the vent. The method further comprising emptying spent media from the dry scrubber media bed prior to any of either of the placing the media container or placing the vacuum pressure.

BRIEF DESCRIPTION OF THE ILLUSTRATIONS

In order that the invention may be better understood, embodiments of the deep bed scrubber section and method of filling and unloading media therewith in accordance with the present invention will now be described by way of examples. These embodiments are not to limit the scope of the present invention as other embodiments of the deep bed scrubber section will become apparent to one having ordinary skill in the art upon reading the instant description. Examples of the present invention are shown in figures wherein.

DETAILED DESCRIPTION

Figure 1:
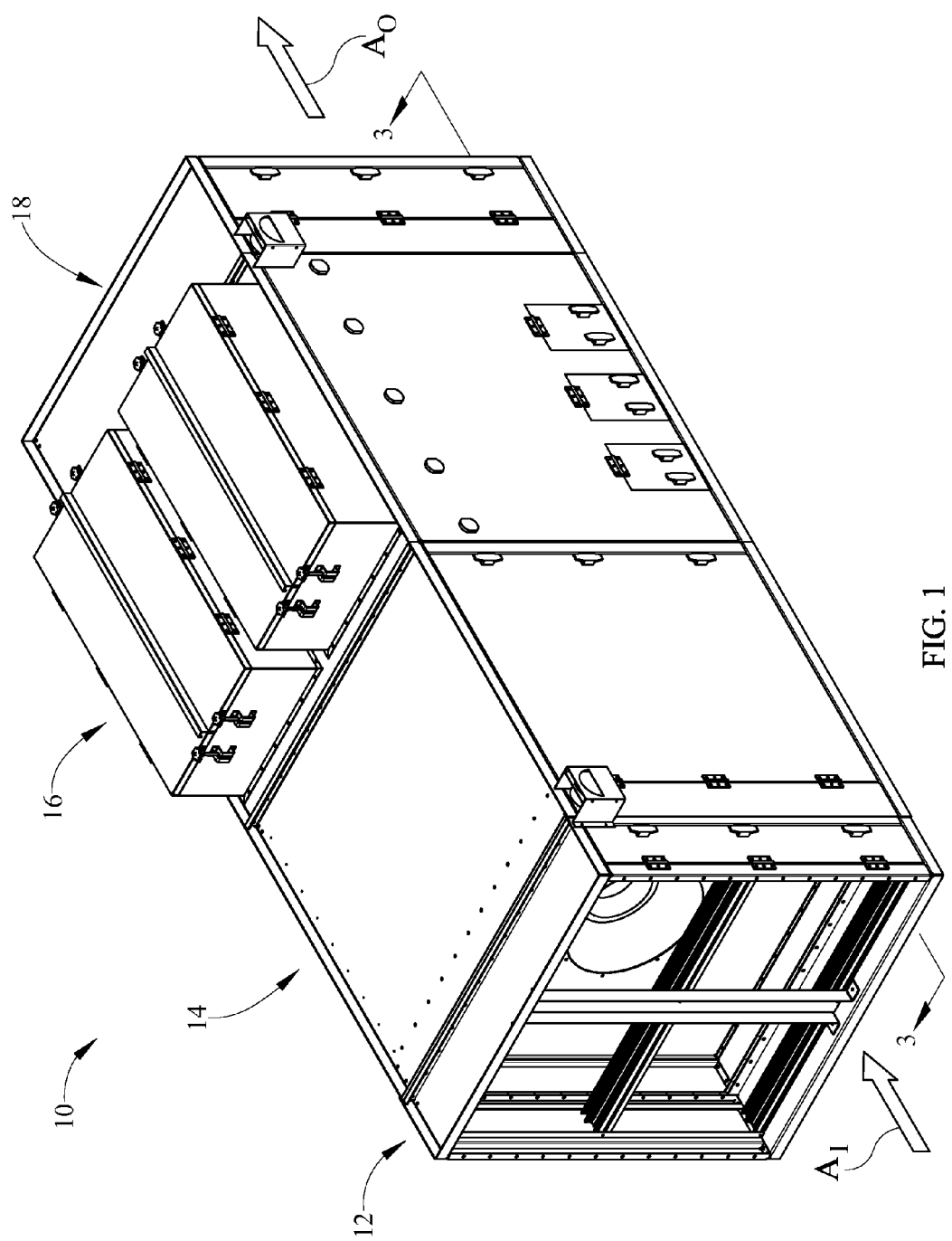
FIG. 1 is a perspective view of an air handling filtration apparatus.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-11, various views of an air handling filtration section having a deep bed scrubbing section or device which filters air for the use of a plurality of media beds. The media bed depth, measured in the direction of airflow, is adjustable which allows for increased or decreased amount of filtration through the increased or decreased amount of a media within the bed volume. Additionally, the use of an adjustable media bed allows the coordination of media change out scheduling to a desired time period. Additionally, the media bed may be adjustable to a V-shaped configuration in order to increase the surface area of media exposure. In turn, this increases filtration without increasing pressure drop across the filtration section. Finally, the system may be utilized in a claimed process to fill or empty the deep bed scrubber.

Referring now to FIG. 1, a perspective view of an air handling filtration system 10 is depicted, defined by a plurality of sections which each provide a distinct function. At the left-hand end of the device is a particulate pre-filter section 12. To the left of the pre-filter section 12 is a blower section 14 having a motor and fan or blower therein. The fan or blower pull air through the pre-filter section 12 and blow air through the downstream sections of the system 10. To the right of the blower section 14 is a media bed filtration section 16. This filtration section 16 includes a plurality of media beds aligned in series and movable perforated sidewalls which are utilized to adjust media bed depth, measured in the direction of airflow through the section 16. To the right of the media bed filtration section 16 is a final particulate high efficiency filter section 18 which performs a final filtration of the air before the air moves back through duct work and into a building or other structure utilizing the air handling equipment.

At the lower left side of the Figure, an arrow labeled $A_I$ indicates an airflow inlet. At the opposite end of the air handling filtration equipment 10 is a second arrow indicating airflow output or outlet $A_O$. These two arrows indicate the movement of air through the air filtration equipment from the particulate pre-filter section 12 through the blower section 14, the media bed filtration section 16 and the final particulate high efficiency filter section 18. Moreover, these arrows define an airflow path passing through the system 10 and each of the sections 12, 14, 16, 18 respectively.

Figure 2:
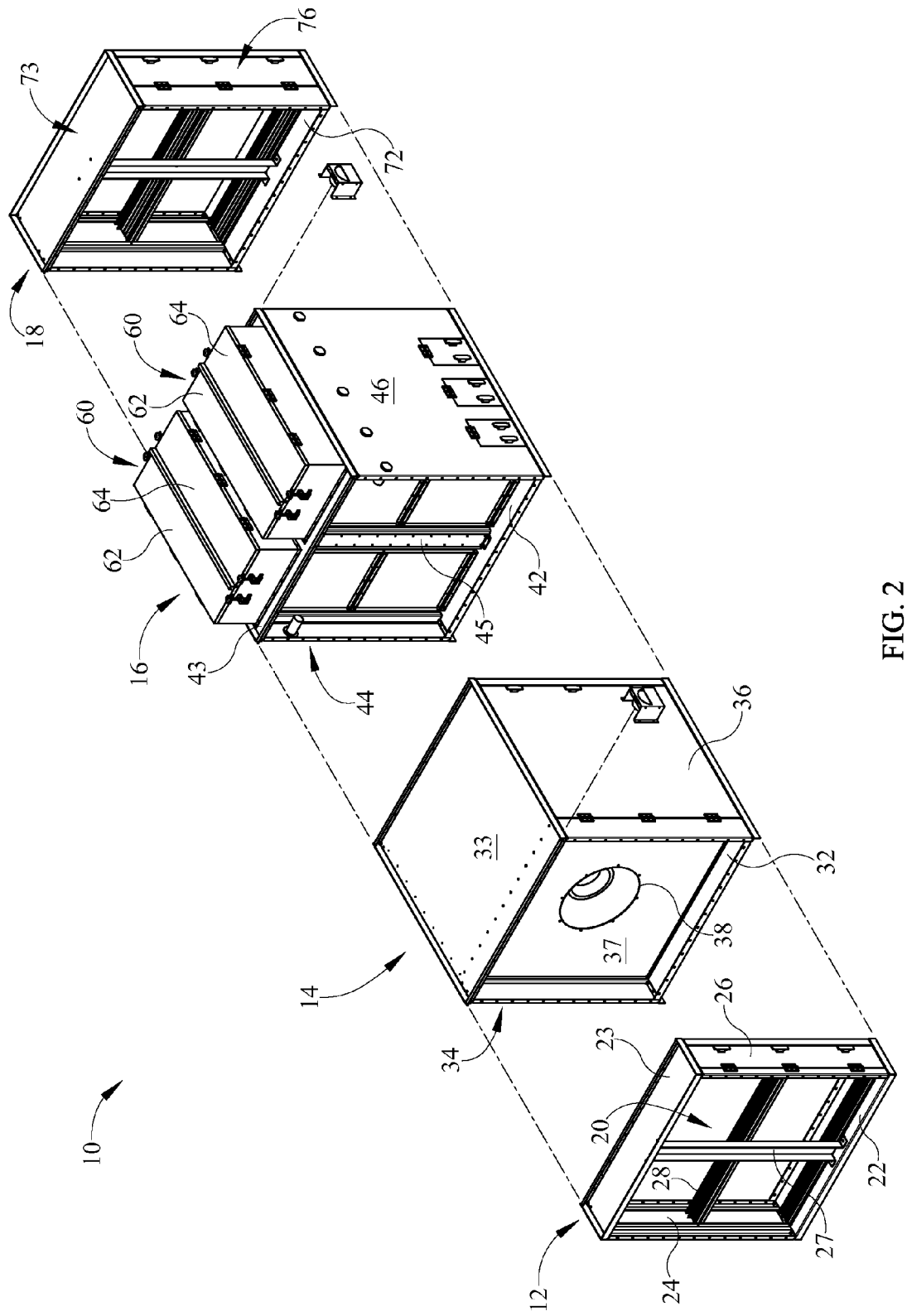
FIG. 2 is an exploded perspective view of the air handling filtration apparatus of FIG. 1.

Referring now to FIG. 2, an exploded perspective view of the air handling filtration equipment 10 is depicted. Each of the sections is exploded from one another to provide additional detail. The particulate pre-filter section includes a filter frame portion 20 surrounded by an upper ceiling 23, a floor 22, and first and second sidewalls 24, 26. The section 12 may include one access panel to remove and replace filters. According to the exemplary embodiment, the sidewall 26 may be hingedly attached to the structure to allow opening and closing, and thereby granting access to the frame portion 20. The frame portion 20 provides location for seating of filters (not shown) which function as pre-filtering for air moving into the air handling equipment 10. The filter frame portion 20 also acts as a structural support for the surrounding sidewalls 24, 26 and the floor 22 and ceiling 23. The frame portion 20 includes at least one vertical support 27 and one horizontal support 28. The horizontal support and vertical support 27, 28 may be utilized in combination with the surrounding frame members 22, 23, 24 and 26 to receive and maintain air filtering media (not shown) that performs the pre-filtering function.

Moving in the direction of the airflow path 12, adjacent and exploded from the pre-filter section 12 is the blower section 14. The pre-filter section 12 and the blower section 14 may be connected on a variety of fixed or removable connections including bolted or screw connected flanges, rivets, fasteners and the like. The blower section 14 is defined by a floor 32 and a ceiling 33 which extend between first and second sidewalls 34, 36. The sidewall 36 is shown being hingedly connected to the remainder of the structure, although various panels may be removable and should not be considered limiting. The hinged connection allows opening of sidewall 36 and access to the blower 35 and motor 39 (FIG. 3) therein for maintenance or replacement. Disposed between the pre-filter section 14 and the interior of the blower section 14 is a fan housing or cowling 37 having a central aperture 38 through which air is pulled into the blower section 14. The aperture 38 defines an inlet into the fan or blower. The fan 35 (FIG. 3) may be in the range of from 20 cubic feet per minute ("CFM") up to many thousand CFM in capacity. For example, the fan size may provide between 500-10,000 CFM depending on the motor size and desired amount of air handling as will be understood by one skilled in the art. Accordingly, the housings for each of the particulate pre-filter section 12, the blower section 14, the media bed filtration section 16 and the final particulate high efficiency filter section 18 all may be sized initially in accordance with the airflow desired by the air handling filtration equipment 10.

To the right of the blower section 14 is the media bed filtration section 16. The blower section 14 and media bed filtration section 16 may be connected in a variety of fixed or removable manners including riveted, bolted or screw connected flanges for example. Additionally, sealing materials or gaskets may be utilized between each of the sections. The filtration section 16 includes a plurality of enclosure surface surfaces defining a volume including a floor 42, a sidewall 44, 46 and an upper ceiling 43. The media bed filtration section 16 defines a volume wherein a plurality of media beds are located and formed by the sidewalls 44, 46, as well as perforated sidewalls 82. Extending from the ceiling area 43 is at least one access hatch 60 including first and second doors 62, 64. The access hatch 60 provides access to the adjustable compartment or sidewalls 84 (FIG. 4) within the media bed filtration section 16, which defined the volumes of the media beds.

Adjacent the media bed filtration section 16 in the direction of airflow A is the final particulate high efficiency section 18. This section is defined by a floor 72, ceiling 73, and two opposed sidewalls 74, 76. Extending between the sidewalls 74, 76 and the floor and ceiling 72, 73 is a frame portion 80. The frame portion is defined by a vertical support 77 and a horizontal support 78 for retaining high efficiency filters. Sidewall 76 includes a hinged door portion which may be opened to access the frame area wherein the filters may be positioned for use. Additionally, the door may be utilized to change or remove filters. Various high efficiency or HEPA filters may be utilized.

Figure 3:
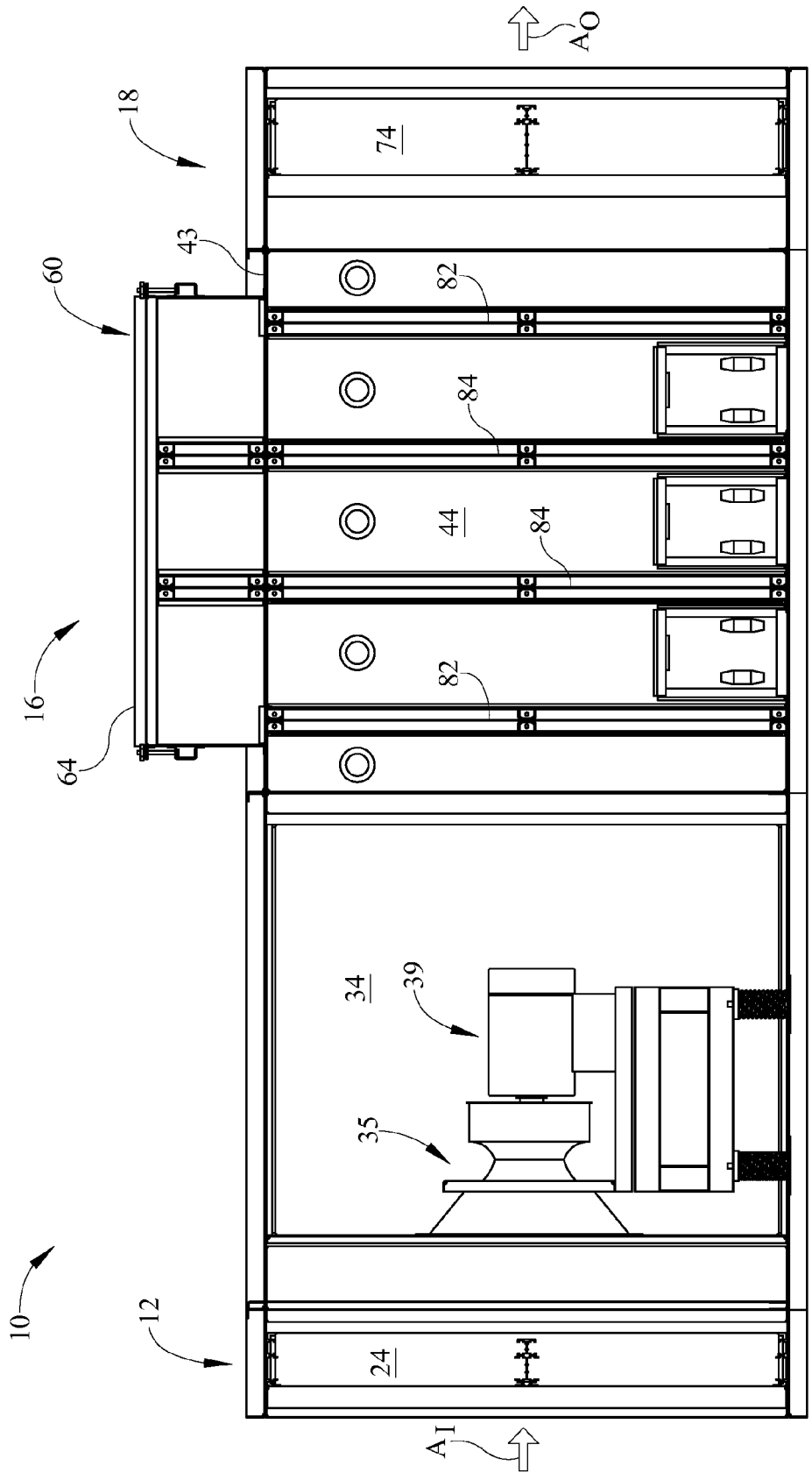
FIG. 3 is a side section view of the air handling filtration apparatus of FIG. 1.

Referring now to FIG. 3, a side-section view of air handling filtration equipment 10 is depicted. The design of the equipment 10 defines the airflow path A which moves from the left-hand side of the device 10 to the right-hand side. The particulate pre-filter section 12 first filters air with a highly porous media to remove any particulate which might otherwise damage the fan 35 and motor 39. The fan 35 and motor 39 are positioned on a motor stand extending from the floor 32 of the blower section. The fan 35 pulls air in through the particulate pre-filter section 12 and through the blower section 14 moving from left to right toward the media bed filtration section 16.

In the section view, the sidewall 44 is shown and the at least one access hatch 60 is shown extending above the ceiling 43 of the section 16. The access hatch 60 allows for access to and movement of media bed sidewalls or compartment walls 84 which may be moved to vary depth of the bed of media, as measured along the direction of airflow. As the airflow path moves across or through the air handling equipment 10, unfiltered air moves from the input end from the left-hand side of the section through a plurality of media beds and through an output end. Relative to the filtration section 16, air entering at the left-hand side is unfiltered. However, air exiting at the right-hand side is filtered after passing through the plurality of media beds. Although the terms unfiltered and filtered are not referred to in an absolute sense since the airflow is filtered by the pre-filter section 12 and is filtered after the section 16 by the high-efficiency filtration section 18. After passing through the media bed filtration section 16, air exits through the particulate high efficiency section 18.

Figure 4:
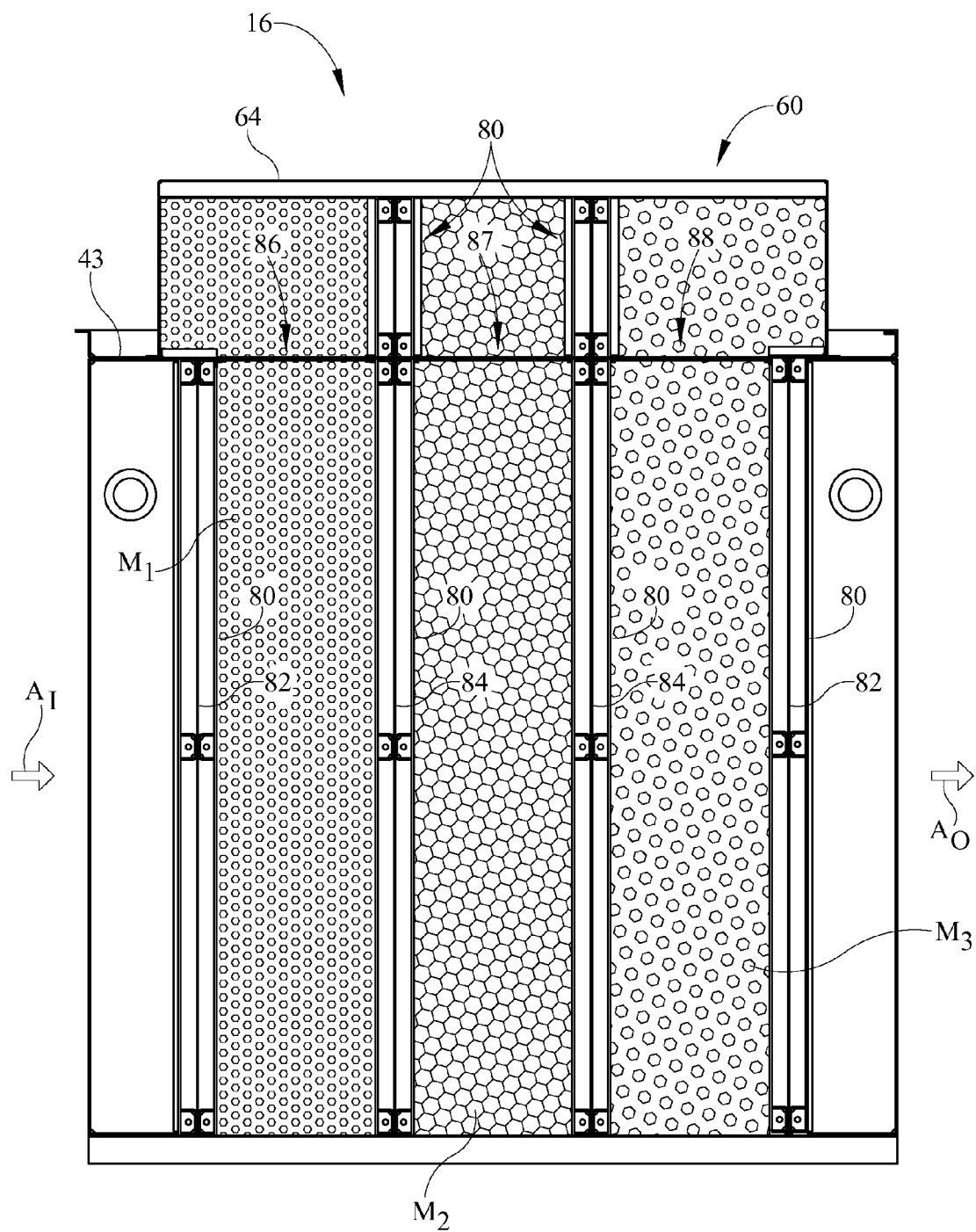
FIG. 4 is a side section view of a deep bed scrubber section of the air handling filtration apparatus.

Referring now to FIG. 4, a side-section view of the media filtration section 16 is depicted. Extending from the top of ceiling 43 is the access hatch 60 which provides access to the perforated sidewalls or compartment walls 84 located within the filtration section 16. Depending through the access hatch 60 and downwardly along side are a plurality of tracks 80. These tracks provide a location to slidably receive the perforated sidewalls 84 within the filtration section. The tracks 80 may be formed in a variety of shapes and materials so as to define slots or which slidably receive the perforated sidewalls 84. The tracks 80 may be spaced apart in variable increments in order to allow for adjustment of perforated compartment walls or sidewalls 84 and therefore increase or decrease the media bed depth, measured in a direction of airflow movement. As depicted in FIG. 4, the airflow moves from left to right from the air inlet side to the air outlet side. The tracks 80 may be spaced apart, for example, in increments of six inches, twelve inches or eighteen inches. However, these measurements are merely exemplary and should not be considered limiting, as various dimensions may be utilized depending on the media bed depth required to meet scrubbing goals for air being cleaned. Additionally, perforated sidewalls 84 may be moved or removed in order to vary the size of any of the plurality of media compartments 86, 87, and 88 are shown, the number of media compartments may vary and may be fewer or more numerous than shown. One skilled in the art will realize that the length of section 16 need only be varied, tracks 80 be moved, or additional tracks 80 be added to provide such adjustability.

At the input end and output end of the filtration section 16 are shortened sidewalls 82. Between the perforated sidewalls at the input and output end are two longer sidewalls 84 which extend upward into the access hatch area 60. These perforated sidewalls are longer so that air cannot bypass the filtration area through the volume defined by the access hatch 60, and therefore bypass the filtration process. The perforated sidewalls 82, 84 define volumes wherein the media M may be located. According to the exemplary instant embodiment, the section 16 has three compartments and is filled with three types of media $M_1$, $M_2$, $M_3$. The filter section 16 comprises three media bed compartments 86, 87 and 88. These media beds are adjustable in size by movement of the sidewalls 84. By adjusting the slidable sidewalls 84, the horizontal dimension or depth, measured in the direction of airflow, allows for variation of the amount of media placed in the various media bed compartments 86, 87, 88. Additionally, since the amount of media may be changed, the life of the media may be varied. As a result, a user may place an amount of media in a compartment by varying the compartment size in order to regulate or control the time between required media changes. The media compartments are aligned in series. The air passes through each compartment 86, 87, and 88 before exiting at the air outlet side of the section 16.

Figure 5:
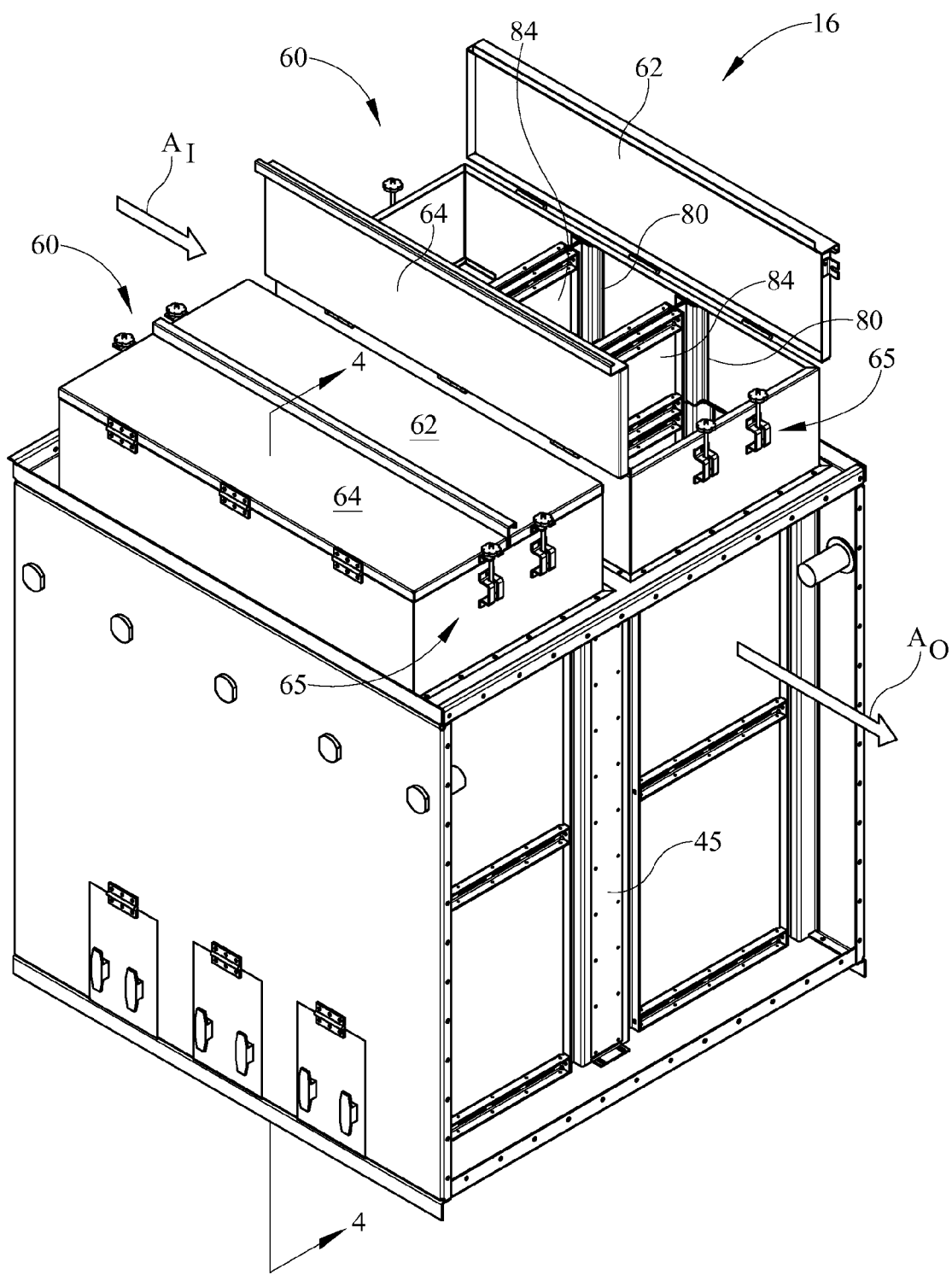
FIG. 5 is a perspective view of the deep bed scrubber section of FIG. 4 with an upper access hatch in the open position.

Referring now to FIG. 5, the section 16 is shown in perspective view with an upper access hatch 60 opened. The compartment walls 84 are shown disposed within tracks 80. This allows vertical sliding of the walls 84 from the section 16 and through the access hatches 60. As previously described, various structures may be used to form tracks 80. The structures need only be formed to receive corresponding supports which frame the perforated sidewalls 84. The airflow $A_I, A_O$ passes through the media beds (FIG. 4) and the perforated compartment walls 84 which are generally perpendicular to the airflow.

As shown in FIG. 5, there are two access hatches 60. These hatches provide access to two halves of the section 16. Internally, these halves may be separated by a screen, mesh or other material which allows fluid communication there between. Alternatively, a solid material may be utilized.

Figure 6:
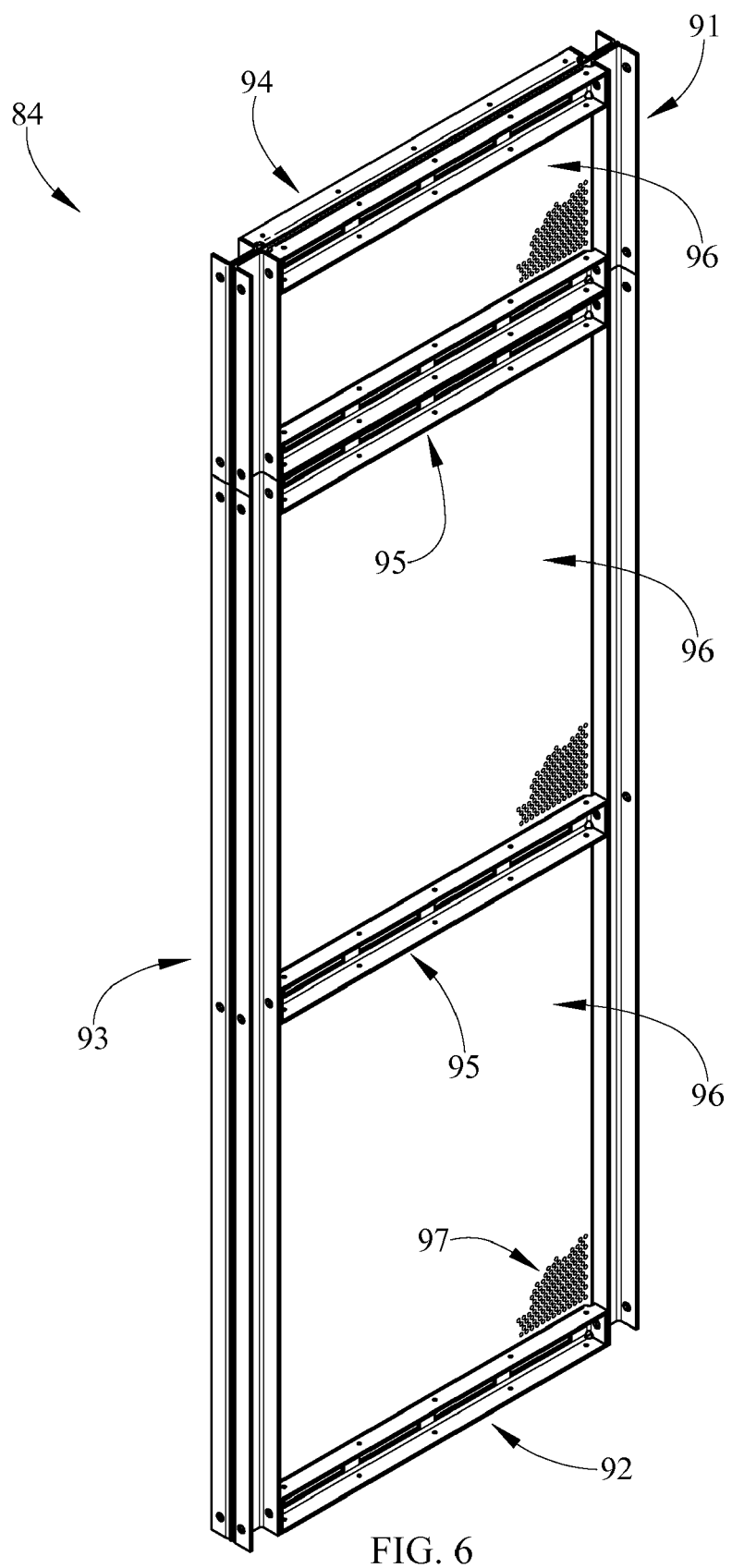
FIG. 6 is an exemplary movable compartment wall for use with the deep bed scrubber section of FIG. 4.

Referring now to FIG. 6, a perspective view of an exemplary perforated sidewall 84 is depicted. The sidewall or compartment wall 84 includes a first support 91 and an opposite second support 93. The supports 91, 93 are vertically oriented and extend downwardly into the media bed filtration section 16 between the tracks 80. The first support and second support may be formed of I-beams or channel beams or other structural supports which may be suitable and useable with any track structure which is utilized. These supports 91, 93 are sized to cooperate in slidable fashion with the tracks 80. The exemplary first and second supports 91, 93 include a plurality of fastener apertures which are utilized to retain the compartment wall 84 in position and/or retain the plurality of structural support elements together. Extending between the first and second supports 91, 93 are lower and upper supports 92, 94. The lower and upper supports 92, 94 are bolted, fastened, affixed or otherwise connected or retained to the first and second supports 91, 93 and may be done so in a variety of fashions. Also extending between the first and second supports 91, 93 is at least one cross-member 95. This at least one member 95 may be formed of some structural element to provide lateral support between the vertical first and second supports 91, 93. The at least one cross-brace member 95 provides a structure to which a perforated material 96 may be affixed or may be supported. The perforated material 96 of the exemplary embodiment is metallic with a plurality of stamped, cut or otherwise formed apertures 97 therein. The apertures 97 allow airflow to pass through the perforated materials 96, and therefore pass through the filtration section 16 in the direction of airflow path previously discussed. Additionally, the apertures 97 are sized so that the media M disposed within each of the media bed compartments 86, 87, 88 cannot pass through the apertures 97. Thus, the compartment walls 84 act to retain the media within the desired bed compartment while still allowing airflow to pass through the section 16. Since the media M within the filtration section 16 may be separated in this fashion, different media types or absorbents may be utilized so that the perforated material 96 may alternatively be formed of fibrous filter material or pleated filter material, as long as the material does not cause significant pressure drop or any pressure drop above a desired amount. However, this is not limiting, as alternatively a single media or two or more media types may utilized. Such is indicated schematically in the beds shown in FIG. 4 as $M_1$, $M_2$, and $M_3$.

Figure 7:
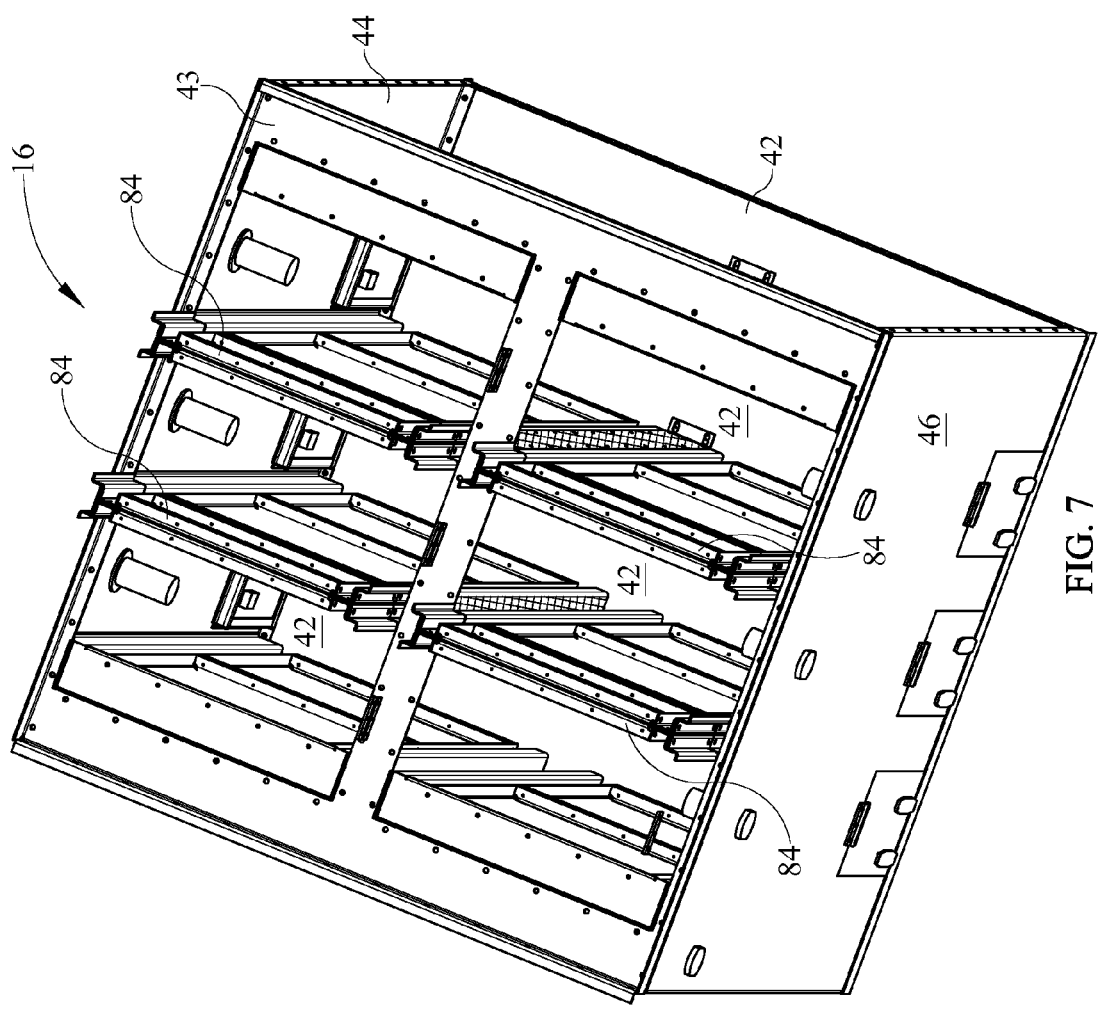
FIG. 7 is an upper perspective view of the deep bed scrubber section with the upper component removed to show the compartment walls in a first configuration.
Figure 8:
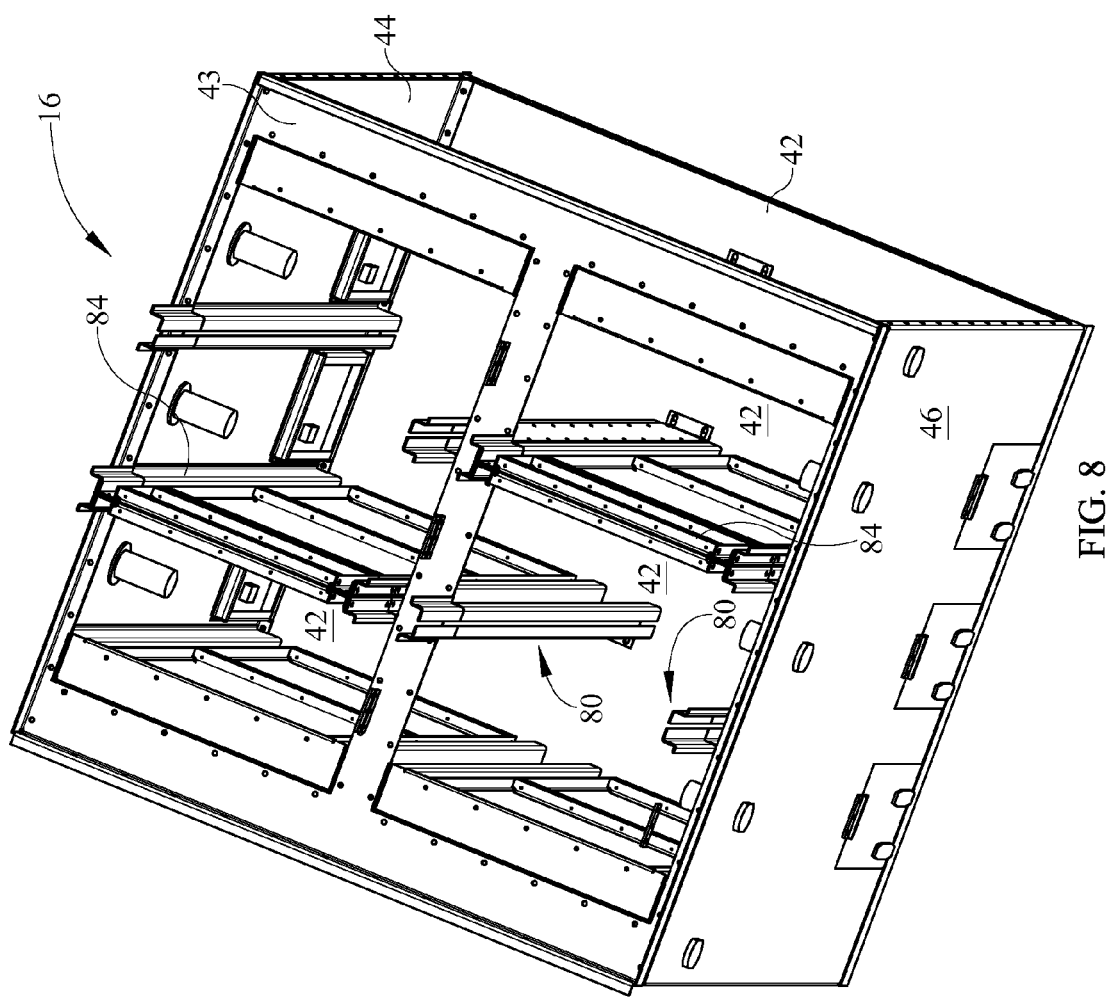
FIG. 8 is an upper perspective view of the deep bed scrubber section with the upper component removed to show the compartment walls in a second configuration.

Referring now to FIG. 7, an upper perspective view of the filtration section 16 is depicted. In this view, the compartment walls 84 are located within two sides of the filtration section 16. The sidewalls 84 are both located within each side of the section. As compared with FIG. 8, one of the sidewalls or compartment walls 84 is removed on each side of the section 16. This removes one compartment from the section, but also changes the configuration of the media bed compartments so that additional media can be loaded into one compartment to provide a longer lasting media amount. Additionally, configurations may be provided by moving the compartment walls or adding additional tracks to provide additional configurations. This provides a means for a user to size a compartment in order to provide a desirable media life. In turn, a user can therefore tune the filtration section to require media replacement on a desirable service or maintenance cycle of a desired time period. Additionally, referring again to FIG. 7, the use of a plurality of compartments further provides a plurality of beds which may contain differing media beds so as to scrub air of different types of toxins or contaminants.

Referring again to FIG. 8, the exemplary tracks 80 are shown in the locations where the compartment walls 84 are removed. According to the exemplary embodiment, the tracks 80 are generally channel shaped structures and have a vertical groove along the web of the channel. As best shown in FIG. 6, the vertical members 91, 93 are I-beams which slide downwardly through the channel shaped track 80. Specifically, the outer flanges of members 91, 93 fit within channels 80 and the webs of beams 91, 93 pass through the guides or grooves of the channels 80. However, this is merely one means of guiding the walls 84 into the tracks 80 and should not be considered limiting as various structures may be utilized.

Figure 9:
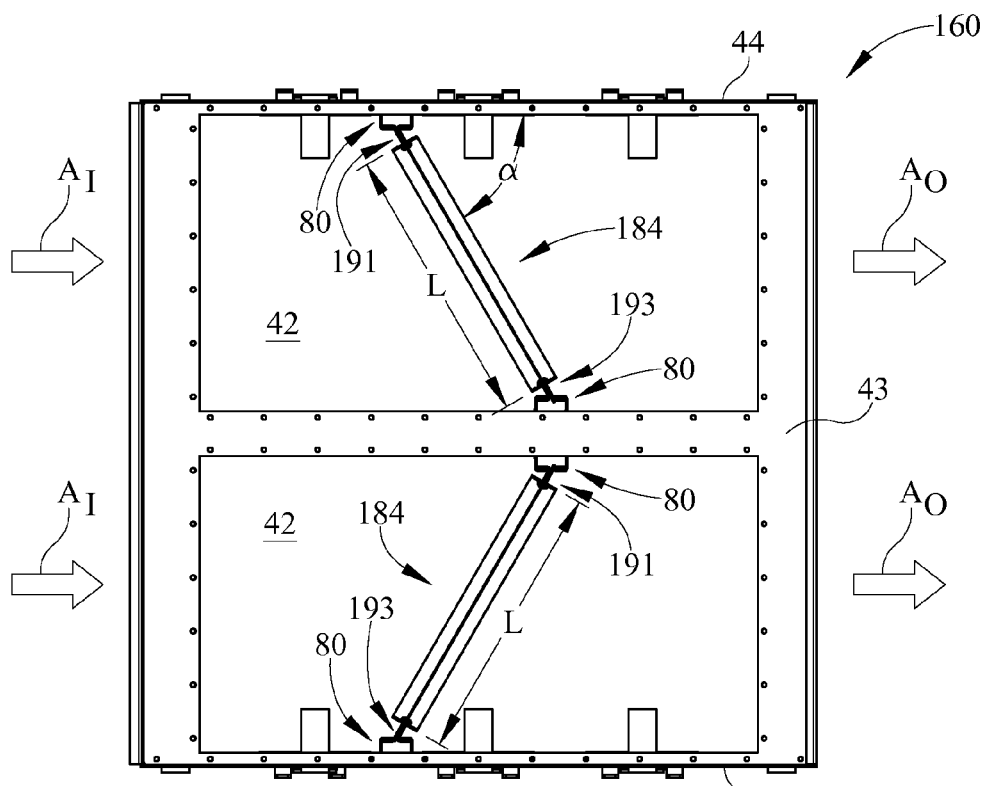
FIG. 9 is a top view of a media bed filtration section with alternative compartment wall configuration.
Figure 10:
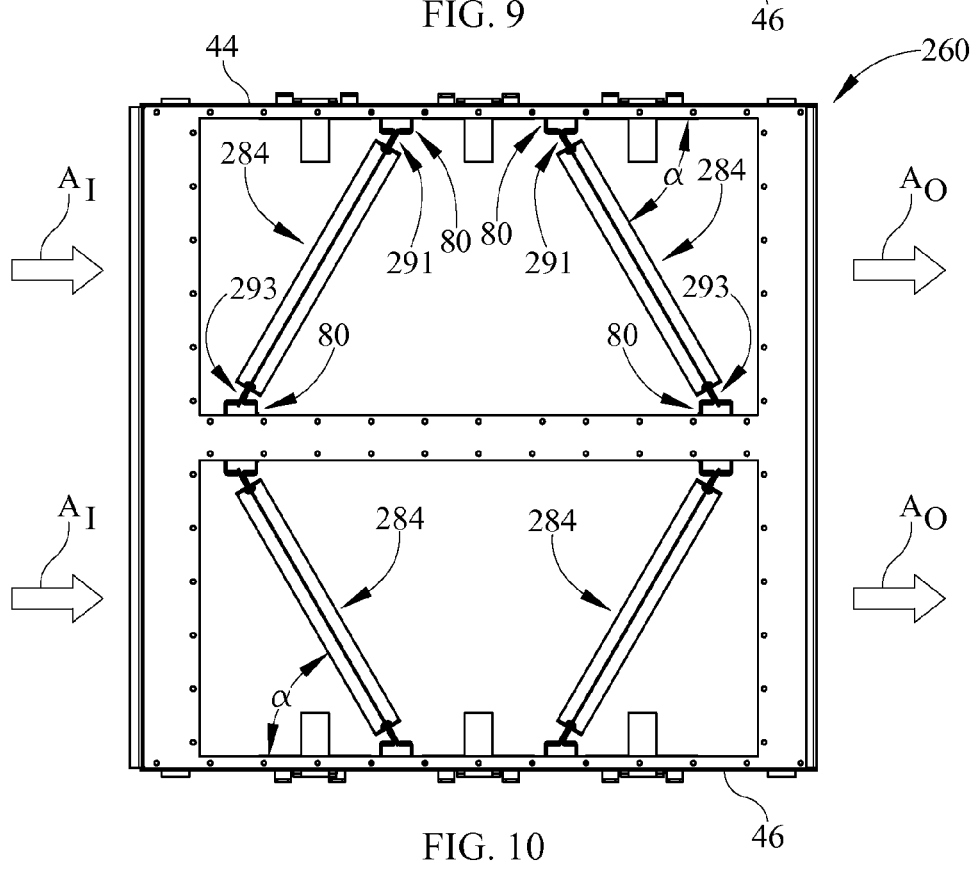
FIG. 10 is a top view of a media bed filtration section with a second alternative compartment wall configuration; and, FIG. 11 is a perspective view of the air handling filtration equipment being filled with new media and cleaned of old media.

Referring now to FIGS. 9 and 10, alternative compartment wall configurations are depicted which provide additional surface area for media. This provides increased filtration through the media beds of the filtration section 16 without increasing pressure drop.

Referring now to FIG. 9, an alternative filtration section 160 is depicted in a top view. The filtration section 160 is generally the same as the previous embodiment and includes a floor 42, a ceiling 43 which is partially removed to reveal the interior of the section 160, and opposed sidewalls 44, 46. Airflow path A moves from the input $A_I$ to the outlet or output side $A_O$.

The section 160 also includes tracks 80 which are moved from the positions shown in the previous embodiment. The tracks 80 of the instant embodiment are offset from one another in the direction of the airflow path A. A compartment wall 184 extends between the offset tracks 184 at an angle α to the sidewalls 44, 46. The angle may be between about 20 degrees and about 70 degrees. The sidewall 184 has a length L which may be longer than the sidewalls 84 previously described. The increased length is due to the increase in distance to extend between tracks 80 at the angle α.

The tracks 80 are channel shaped although such description should not be considered limiting. The channel includes a guide or groove extending vertically through the web of the structure which receives at least a flange of the members 191, 193 as with the previous embodiment. Additionally, due to the angle of the compartment wall 184, the flanges of the members 191, 193 are angled relative to the web, rather than perpendicular as the norm, to allow positioning in the tracks 80 at the angle desired. Alternatively, the tracks 80 may be angled to alleviate bending of the flanges of members 191, 193

According to the embodiment of FIG. 9, the section 160 has two flow paths, which may or may not be in flow communication. The first path includes a single sidewall 184 and the second path includes a single sidewall 184 which form a generally V-shape near the center of the section 160. The V-shape formed between the halves of section 160 is aligned with or parallel to the direction of the airflow path A. The section 160 may have one or more of the V-shaped configurations within the section 160.

Referring now to FIG. 10, a further alternative section 260 is depicted. The section 260 also includes a floor 42, ceiling 43 (partially removed), and opposed sidewalls including walls 44, 46. The tracks 80 are similar to the previous embodiments and are formed by channels 80. The tracks 80 are disposed in different locations than the previous embodiments which provides for a different configuration of the compartment walls 284. The section comprises two compartment walls 284 in each half of the section 260. Thus a V-shaped configuration may be formed by the compartment walls 284 wherein the V-shape is oriented in a direction transverse to the airflow path A. Additionally, the embodiment of FIG. 10 utilizes multiple compartment walls 284 within each half of the section 260 and therefore compartment walls 284 also meet near the center of the section 260, similar to the embodiment of FIG. 9. Thus the V-shapes defined by the compartment walls may also be oriented in a direction which is aligned with the airflow path A.

Referring again to FIG. 4, the media 100 is shown disposed within the three media bed compartments 86, 87, 88. The media of the exemplary embodiment may be an oxidant based pellet form chemical media composed of a combination of activated alumina, binders and potassium permanganate. The potassium permanganate is applied uniformly during pellet formation and is distributed throughout the pellet volume to create a homogeneous particle providing a maximum amount of impregnate for chemical reaction and optimal performance. The term pellet should not be considered limiting because the pellets may be spherical or cylindrical or various shapes not necessarily described. Increased surface area of the pellet may be desirable. The oxidant based media efficiently moves volatile organic compounds and indicated target gases. For example, target gases where impurities may include, but not be limited to, formaldehyde, hydrogen sulfide, aldehydes, and organic acids, nitric oxide and sulfur oxide. The oxidant chemisorptive process removes contaminant gases by adsorption, absorption and chemical reaction. During such process, contaminants are trapped within the pellet wherein oxidation converts the contaminants into harmless compounds and mitigates the possibility of desorption. By way of example, the product may have a moisture content of 15% minimum according to ASTM D2867; may have a crush strength of 40-60 N according to internal method; may have a bulk density of about 50 lbs./ft$^3$ according to internal method; may have a mesh size of greater than or equal to 95% 3×7 mesh according to ASTM D2862; and may have potassium permanganate content of about 8% minimum according to internal method. This media may be marketed under the trade name SAAFOXIDANT by AAF INTERNATIONAL of Louisville, Ky.

As an alternative, a carbon based media may be utilized which is a pelletized activated carbon media which removes toxic or impure contaminates from the airflow passing through the media bed filtration section 16. The activated carbon media may filter chlorine, hydrocarbon, nitrogen dioxide and volatile organic compounds. The activated carbon media removes toxic and impure gases by adsorption so that the gases remain on the surface of the pellets utilized on the media bed. The activated carbon based media is available under the trade name SAAFCarb Media and may have the following exemplary specifications: moisture content of about 5% maximum; hardness of about 95% minimum; bulk density of about 30 lbs./ft$^3$; pellet diameter of 4 mm; ash content of about 12% maximum; and carbon tetrachloride adsorption of about 60%.

Additionally, as a further alternative, blends of the activated carbon medium and oxidant media may be utilized to target specific types of contaminates or volatile organic compounds. With the plurality of beds 86, 87, 88 arranged in series, various media types and/or blends may be placed in each of the compartment beds to scrub airflow of various types of contaminants or the like. Additionally, as previously described, adjustability of the perforated sidewalls allows for variation of the bed size in the direction of airflow so as to tailor a maintenance program at a desired time frequency or cycle. The table below indicates the exemplary types of contaminants that may be targeted with the media utilized with the media bed filtration section 16.

|                   | SAAFCarb | SAAFCarb MA | SAAFCarb MA.HT | SAAFCarb MC | SAAFOxidant | SAAFBlend GP | SAAFCarb MB |
|-------------------|----------|-------------|----------------|-------------|-------------|--------------|-------------|
| ammonia           |          |             |                |             |             |              | x           |
| chlorine          | x        | x           | x              |             |             |              |             |
| hydrogen sulfide  |          | x           | x              |             | x           |              |             |
| sulfur dioxide    |          | x           | x              |             | x           |              |             |
| ozone             | x        |             |                |             |             |              |             |
| nitrogen dioxide  | x        | x           | x              |             | x           | x            |             |
| nitric oxide      |          | x           | x              |             | x           |              |             |
| methyl mercaptar  | x        | x           | x              |             | x           |              |             |
| ethyl mercaptan   | x        | x           | x              |             |             | x            |             |
| methyl sulfide    | x        |             | x              |             |             | x            |             |
| hydrogen bromide  |          | x           |                |             |             | x            |             |
| hydrogen chloride |          | x           |                |             |             | x            |             |
| hydrogen fluoride |          | x           |                |             |             | x            |             |
| hydrogen iodide   |          | x           |                |             |             | x            |             |

Figure 11:
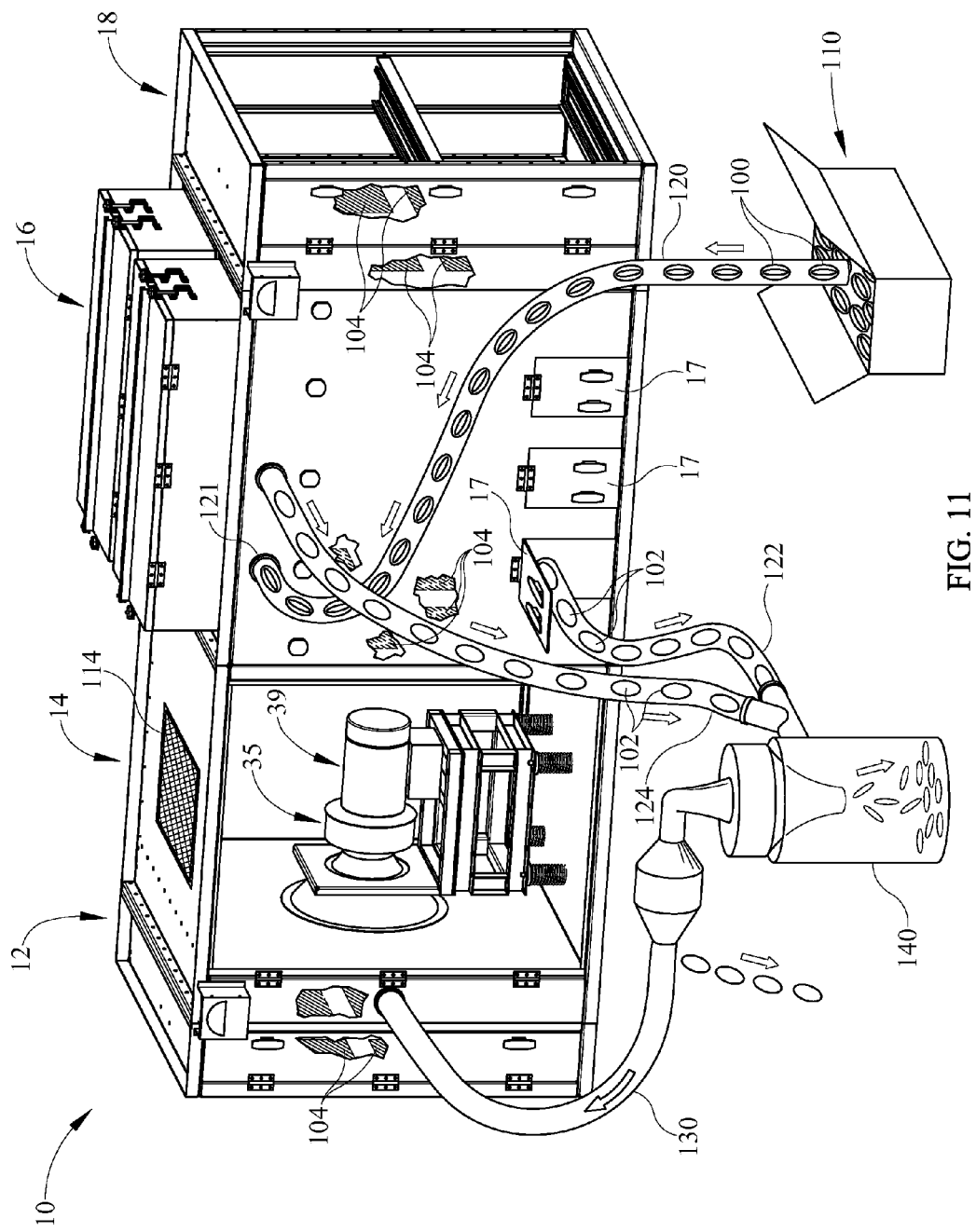

Referring now to FIG. 11, a side perspective view of the air handling filtration equipment 10 is depicted with various sidewalls removed to reveal the interior portions of the system 10. In this view, a method of replacing spent filter media between a media bed of a dry scrubber and a filter media container may be described. The method of media replacement requires flow communication with a supply or fresh media container 110. Additionally, the method requires flow communication with a spent media collector 140. The method may be utilized to remove spent media from the filtration section 16, and media beds therein, and transfer fresh media from a container to the at least one media bed may also be described. With respect to the following description, the spent media 102 is indicated by a single oval shaped pellet while the fresh media 100 is indicated by double oval shaped pellets.

In the process or method, the spent media 102 is removed prior to filling with fresh media 100. As part of the processes of emptying spent media 102 or filling the section 16 with fresh media 100, the airflow pathway of the air handling filtration equipment 10 is restricted in various locations in order to create negative pressure for removal of spent media 102 and replacement with fresh media 100. This allows negative pressurization of the section 16 to provide suction for the new media 100 and spent media 102. In the exemplary embodiment, the equipment 10 utilizes a blank or restriction devices 104 at the intake of section 12, at the outlet side of section 14 or intake side of section 16, as well as the outlet side of section 16 or inlet side of section 18. These blanks 104 are shown through material cut-aways of the filtration equipment 10. These restrictions 104 may be positioned in any order and additionally may be positioned before or after the additional fluid communication tubes 120, 122, 124, and 130 are positioned, as described further herein.

Since the intake to section 12 is restricted, an air intake or supply line 130 is provided which provides air to the intake side of fan 35. The downstream end of the supply line 130 is located at the intake side of the fan 35 and the upstream side of the supply line 130 is located at a de-dusting or alternate filtering or collection device 140. Thus air flow through intake tube 130 moves from the de-duster 140 to the outlet side of section 12 or inlet side of section 14. In either event, the inlet tube 130 is positioned downstream of the blank 104 at section 12.

Fan 35 is operated during the process of emptying or filling the air handling filtration system 10. Since the system 10 also includes blanks between sections 14 and 16, a vent 114 is utilized to release or exhaust air from the blower section 14 during operation. This vent 114 is closed or blanked during normal operation of the air handling equipment 10. Additionally, as will be understood with the further description, the fan or blower 35 establishes a negative pressure in the media bed section 16 which allows for removal of spent media 102 and loading of fresh media 100.

Extending from the spent media collect 140, on an intake side of the fan 35, is at least one material intake tube 122. The unloading or intake tube 122 is located at a bottom portion of the media bed filtration section 16 and passes through a sidewall or door 17. As shown in the exemplary embodiment, there is a plurality of doors 17 extending across the lower portion of the media bed filtration section 16. The exemplary embodiment utilizes one door 17 for each of the media beds 86, 87, 88. As an alternative, or in addition to the tube 122, an upper unloading or intake tube 124 is also shown extending from the upper portion of the section 16 for removing spent media 102. One or more unloading tubes 122 may be located in various positions about the media bed filtration section 16 and therefore the exemplary embodiment should not be considered limiting. A negative pressure within the section 16 is established by the fan 35 pulling air through the tube 130, de-duster 140 and at least one tube 122. As previously indicated, the fan exhausts through the vent 114.

With the negative pressure established in the media bed filtration section 16, the fresh or new media 100 is disposed in a container 110. The container is in fluid communication with the media bed filtration section 16 through tube 120. The tube 120 acts as a conduit for the negative pressure of section 16 and the negative pressure draws the media 100 into the tube from the media container 110. This process begins filling the media beds. A single port 121 for the tube 120 is depicted in the drawings, although various ports may be disposed within the section 16. For example, one or more ports may be utilized which correspond to each of the media beds located within the section 16. In the exemplary embodiment of FIG. 11, the tubes 120, 122 and 124 are shown within the section at the same time. It may be desirable however, to utilize the at least one tube 122 at a first time period until the media beds are empty. Then the at least one tube 122 may be removed and the tube 121 may be utilized in a second filling process. As a result, the loading and unloading process may be performed as a multi-step process or may occur as a single step process.

With regard to filling the filtration section 16 with fresh media 100, the media bed filtrations section 16 is placed in flow communication with a filter media container 110 having new or fresh media 100 therein. Next, air supply is connected to an intake side of the fan or blower of the air handling filtration equipment and the fan is powered. A vent 114 allows for exhausting of the fan or blower 35. This fan or blower also provides a negative pressure on the filter media container 110 to begin moving media from the container into the compartment while removing used or spent media from a different location of the media bed compartment 16. This provides a closed loop circuit which removes spent media from the at least one media bed compartment while drawing fresh media into the at least one media bed compartment. The spend media collector acts as an air supply for the fan to draw air into the system and pressurize the air handling filtration equipment 10 during this process.

It should be understood that the processes of loading and unloading are intended to be performed separately, but may occur simultaneously, or in a further alternative separately but without having to power down the system.

The foregoing description of various embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A method of transferring filter media between a media bed of a dry scrubber and a filter media container, comprising:
    placing said media bed in flow communication with said filter media container;
    obstructing a majority of an airflow path of said media bed with at least one blank, said airflow path extending from an unfiltered air input opening of said dry scrubber, through said media bed of said dry bed scrubber, to a filtered air output opening of said dry bed scrubber;
    powering a blower in said airflow path of said media bed when said airflow path is obstructed and said media bed is in flow communication with said filter media container;
    creating a pressure differential to remove used media from said media bed and fill said media bed with fresh media;
    whereby said filter media is transferred between said media bed and said filter media container through a tube.

2. The method of transferring filter media of claim 1, wherein said filter media is pushed from said media bed to said filter media container.

3. The method of transferring filter media of claim 1, wherein said filter media is pulled from said filter media container to said filter media bed.

4. The method of transferring filter media of claim 1, wherein said airflow path is obstructed at a location downstream of said media bed.

5. The method of transferring filter media of claim 1, wherein said airflow path is obstructed at a location upstream of said media bed.

6. The method of transferring filter media of claim 1, wherein said airflow path is obstructed at a location upstream of said blower.

7. A method of transferring filter media between a media bed of a dry scrubber and a filter media container, comprising:
   positioning a blank over an air intake for an air handling system;
   positioning a blank at an output end of a blower section having a blower therein;
   opening a vent in said blower section of said air handling system;
   placing a spent media collector in fluid communication with at least one media bed in a filtration section;
   powering said blower section and utilizing said blower to create a vacuum pressure;
   collecting spent media from said at least one media bed with said vacuum pressure; and
   filling said media bed with fresh media.

8. The method of claim 7 further comprising positioning a blank over said output end of said air handling system.

9. The method of claim 7, said positioning said opening and said placing occurring in any order.

10. A method of transferring filter media between a media container and a dry scrubber media bed section, comprising:
    positioning at least one blank over an air intake for an air handling system;
    positioning at least one vent between a blower section and said dry scrubber media bed section;
    positioning at least one blank at an output end of said dry scrubber media bed section;
    opening a vent in one of a blower section having a blower therein or upstream of said media bed section;
    placing said media container having fresh filtration media in fluid communication with said dry scrubber media bed section;
    placing a vacuum pressure on said media bed section;
    emptying said media bed of spent filtration media and;
    moving said fresh filtration media from said media container into said dry scrubber media bed section to replace said spent media.

11. The method of claim 10 further comprising exhausting said blower through said vent.

12. The method of claim 10 further comprising emptying spent media from said dry scrubber media bed prior to any of either of said placing said media container or placing said vacuum pressure.

* * * * *